(12) United States Patent
Kulkarni (10) Patent No.: US 8,976,659 B2
(45) Date of Patent: Mar. 10, 2015

(54) INTELLIGENT LAYER-2 FORWARDING

(71) Applicant: Brocade Communications Systems, Inc., San Jose, CA (US)

(72) Inventor: Nagalingswami Kulkarni, Bangalore (IN)

(73) Assignee: Brocade Communication Systems, Inc., San Jose, CA (US)

(*) Notice: Subject to any disclaimer, the term of this patent is extended or adjusted under 35 U.S.C. 154(b) by 250 days.

(21) Appl. No.: 13/645,293

(22) Filed: Oct. 4, 2012

(65) Prior Publication Data

US 2013/0094361 A1 Apr. 18, 2013

Related U.S. Application Data

(60) Provisional application No. 61/547,586, filed on Oct. 14, 2011.

(51) Int. Cl.
*H04L 12/26* (2006.01)
*H04L 12/753* (2013.01)
*H04L 12/46* (2006.01)
*H04L 12/931* (2013.01)

(52) U.S. Cl.
CPC ............ *H04L 45/48* (2013.01); *H04L 12/4625* (2013.01); *H04L 49/60* (2013.01)
USPC ........................................... 370/235; 370/244

(58) Field of Classification Search
None
See application file for complete search history.

(56) References Cited

U.S. PATENT DOCUMENTS

2007/0124498 A1* 5/2007 Kaluve et al. ................. 709/242
2007/0159988 A1* 7/2007 Khan et al. .................... 370/256
2007/0242602 A1* 10/2007 Pang et al. ..................... 370/216
2008/0219149 A1* 9/2008 Yoo .............................. 370/217

* cited by examiner

*Primary Examiner* — Chi H Pham
*Assistant Examiner* — Fahmida Chowdhury
(74) *Attorney, Agent, or Firm* — Shun Yao; Park, Vaughan, Fleming & Dowler LLP (57) ABSTRACT

One embodiment of the present invention provides a switch. The switch includes a port management module and a notification module. During operation, the port management module identifies a local port selected to be in a blocking state associated with a spanning tree. The notification module constructs a notification message associated with the blocking state.

20 Claims, 8 Drawing Sheets

FIG. 7 ent application and is
INTELLIGENT LAYER-2 FORWARDING

RELATED APPLICATION

This application claims the benefit of U.S. Provisional Application No. 61/547,586, titled "Mechanism to Avoid Undesired L2 Ethernet Forwarding," by inventor Nagalingswami Kulkarni, filed 14 Oct. 2011, the disclosure of which is incorporated by reference herein.

BACKGROUND

1. Field

The present disclosure relates to a communication network. More specifically, the present disclosure relates to a method and system for efficient layer-2 communication.

2. Related Art

As more data-intensive applications are deployed, layer-2 communication is becoming progressively more important as a value proposition for network architects. It is desirable to provide intelligent data flows on layer-2 links to facilitate efficient communication among switches while providing the flexibility and ease of deployment of the layer-2 communication.

A loop-free topology is usually desirable for layer-2 communication. Spanning Tree Protocol (STP) is a layer-2 network protocol that ensures a loop-free topology in a layer-2 local area network (LAN). The basic function of STP is to prevent loops in a layer-2 topology. STP creates an instance of a spanning tree within a mesh network of connected layer-2 switches (e.g., Ethernet switches). STP disables the links that are not part of the spanning tree by putting the corresponding ports into a blocking state. Such ports are referred to as blocked ports. Consequently, STP creates a single active path between any two layer-2 switches. The switches in a network can form several LANs. STP instances running on switches collectively compute a spanning tree, thereby breaking loops in the network while maintaining access to all LAN segments.

A physical topology of the network can be a mesh and include links that may create a loop. When STP selectively disables communication via some of the network ports to provide a loop-free topology, the disabled ports maintain corresponding STP status. If an active link fails, STP reconstructs the spanning tree instance and enables one of the disabled ports to provide an alternative link. As a result, STP allows a network design to include redundant links which can act as backup links in a failure scenario without requiring manual enabling/disabling of these backup links.

While STP brings many desirable features to layer-2 networks, some issues remain unsolved in efficient layer-2 communication.

SUMMARY

One embodiment of the present invention provides a switch. The switch includes a port management module and a notification module. During operation, the port management module identifies a local port selected to be in a blocking state associated with a spanning tree. The notification module constructs a notification message associated with the blocking state.

In a variation on this embodiment, the notification message has a destination address of a remote switch coupled to the switch via the local port.

In a variation on this embodiment, the notification message is a Bridge Protocol Data Unit (BPDU) associated with a protocol constructing the spanning tree, and a flag is set in the BPDU to indicate the blocking state.

In a variation on this embodiment, the spanning tree is associated with a virtual local area network (VLAN) group. A VLAN group comprises at least one VLAN associated with the switch. The notification message is specific for the VLAN group.

In a variation on this embodiment, the switch also includes a status update module which precludes the notification module from generating the notification message in response to the local port being in a forwarding state associated with the spanning tree.

In a variation on this embodiment, the switch is a fabric switch comprising a plurality of physical switches operating as a single logical switch.

One embodiment of the present invention provides a switch. The switch includes a packet processor and a flow control module. The packet processor extracts from a notification message a blocking state of a port in a remote switch. The blocking state is associated with a spanning tree. The flow control module suppresses flooding via a local peer port of the port in the remote switch in response to extracting the blocking state.

In a variation on this embodiment, the notification message is BPDU associated with a protocol constructing the spanning tree and a flag is set in the BPDU to indicate the blocking state.

In a variation on this embodiment, the spanning tree is associated with a VLAN group. A VLAN group comprises at least one VLAN associated with the switch. The flow control module suppresses flooding for the VLAN group.

In a variation on this embodiment, the flow control module stores information regarding the blocking state in a local forwarding table.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of avoiding undesired layer-2 traffic forwarding in a spanning tree is solved by a switch disseminating blocked-port information to the peer switches (i.e., the switches coupled to the switch). Spanning Tree Protocol (STP) provides a loop-free topology for a layer-2 network. The basic function of STP is to prevent loops in a layer-2 network by creating a spanning tree (can be referred to as a spanning tree instance) in the network. STP elects one switch as the root switch and selects the best paths to the root switch from a respective switch in the network to construct the spanning tree instance. STP puts the ports that are not part of the spanning tree instance into a blocking state. As a result, traffic in the network only travels through the corresponding loop-free tree topology. An updated version of STP, called Rapid Spanning Tree Protocol (RSTP), provides a faster convergence after topology changes. RSTP is described in Institute of Electrical and Electronics Engineers (IEEE) specification 802.1w, "Rapid Reconfiguration of Spanning Tree," available at http://www.ieee802.org/1/pages/802.1w.html, which is incorporated by reference herein. In RSTP, the port of a switch that has the best path to the root switch is referred to as the root port. The forwarding port of a switch (i.e., the ports in a forwarding state) for a respective LAN segment is referred to as a designated port. The ports that couple peer switches can be referred to as peer ports.

A spanning tree instance can be created for a respective virtual LAN (VLAN) in a network using Multiple Spanning Tree Protocol (MSTP). MSTP is defined in IEEE standard 802.1Q-2005, "Virtual Bridged Local Area Networks," available at http://standards.ieee.org/findstds/standard/802.1Q-2005.html, which is incorporated by reference herein. MSTP configures a separate spanning tree (can be referred to as multiple spanning tree instance, or MSTI) for a respective VLAN group. A VLAN group can include one or more VLANs. A respective MSTI can have a separate root switch, and a respective switch belonging to the corresponding VLAN group selects the best path to the root switch to construct the spanning tree for the MSTI.

Typically for RSTP and MSTP, all ports of a root switch are designated ports. When the root switch receives any unknown (i.e., unknown unicast), multicast, or broadcast traffic, the root switch forwards the traffic via all the ports. This process of forwarding via all ports can be referred to as flooding. However, the peer port of a designated port can be in a blocking state (i.e., the peer port may not provide the best path to the root). As a result, the forwarded traffic from the root switch is dropped at the peer port in a blocking state. Hence, flooding traffic via the designated ports of the root switch when the corresponding peer port(s) are in blocking states may lead to several problems. For example, such unnecessary forwarding can consume network bandwidth and resources on the root switch and the adjacent switches, causing congestion and traffic drops to these switches. This unnecessary forwarding also introduces additional operations in the switches, thereby increasing the carbon footprint in the network.

To solve this problem, when a port of a switch is selected to be in a blocking state (i.e., just before the port actually goes into the blocking state) in a spanning tree instance, the switch dynamically constructs a notification message associated with the blocking state and sends the message via the port to the corresponding peer port of a peer switch. After sending the message, the port goes into a blocking state. As a result, the peer switch becomes aware of the blocked peer port and suppresses the flooding to the blocked peer port. This suppression of flooding leads to savings in bandwidth and networking resources. Furthermore, by reducing the operations in network switches, this suppression also reduces the carbon footprint of the corresponding switches.

In some embodiments, a spanning tree instance can be constructed for a respective VLAN group. A port can be in a blocking state for a specific spanning tree instance while in a forwarding state for another spanning tree instance. Under such a scenario, a switch with a blocked port includes the VLAN information in the notification message, and sends the notification message to the peer port. In response to a change to the VLAN (e.g., a link or node failure), switches in the network reconstruct the spanning tree instance. If the blocked port becomes a forwarding port, the switch does not send any notification message for the new spanning tree instance. As a result, the peer switch does not suppress flooding for the new spanning tree instance.

In some embodiments, a switch capable of flooding suppression in a layer-2 spanning tree can be a fabric switch. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to all other devices in the network.

Although the present disclosure is presented using examples based on the layer-2 protocols, embodiments of the present invention are not limited to layer-2 networks. Embodiments of the present invention are relevant to any networking protocol which requires loop-free communication between two networking devices. In this disclosure, the term "layer-2 network" is used in a generic sense, and can refer to any networking layer, sub-layer, or a combination of networking layers.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device that can forward traffic in a network can be referred to as a "switch." Examples of a "switch" include, but are not limited to, a layer-2 switch, a layer-3 router, a TRILL RBridge, or a virtual machine with frame forwarding capability.

The term "spanning tree protocol" is used in a generic sense, and it can refer to any protocol that can be used by devices in a network to construct a spanning tree in a network. Examples of such protocol include, but are not limited to, STP, RSTP, and MSTP. Any variation of a spanning tree protocol can be referred to using the generic term "xSTP." In this disclosure, the terms "spanning tree protocol" and "spanning tree protocol instance" are used interchangeably.

The term "blocking state" is used in a generic sense, and it can refer to a state of a port in a switch, wherein the state indicates that the switch does not forward regular layer-2 data traffic via the port. The port in a blocking state can be referred to as a "blocked port." Examples of a blocking state include, but are not limited to, disabled, blocking, listening, and learning states of STP, and discarding and learning states of RSTP and MSTP. The term "forwarding state" is also used in a generic sense, and it can refer to a state of a port in a switch, wherein the state indicates that the switch forwards regular layer-2 data traffic via the port. The port in a forwarding state can be referred to as a "forwarding port." Examples of a forwarding state include, but are not limited to, the forwarding states of STP, RSTP, and MSTP.

Network Architecture

Figure 1:
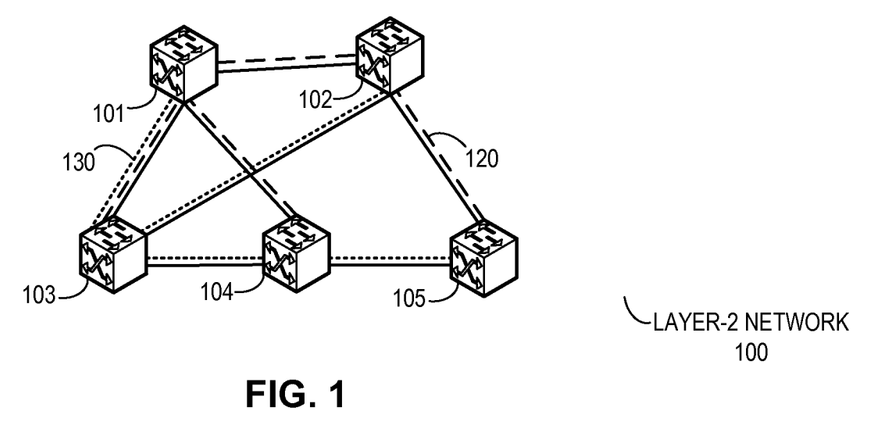
FIG. 1 illustrates exemplary multiple spanning tree instances in a layer-2 network.

FIG. 1 illustrates exemplary multiple spanning tree instances in a layer-2 network. As illustrated in FIG. 1, a layer-2 network 100 includes switches 101, 102, 103, 104, and 105. In some embodiments, one or more switches in network 100 can be a fabric switch and can appear as a single logical switch to all other switches in network 100. During operation, a respective switch in network 100 runs a spanning tree protocol (e.g., MSTP) and constructs a spanning tree instance. For a specific spanning tree instance, the spanning tree protocol disables the links that are not part of the spanning tree instance by putting the corresponding ports into a blocking state. The spanning tree protocol thus creates a single active path between any two switches in network 100 for the spanning tree instance.

In some embodiments, a spanning tree instance can be constructed for a respective VLAN group. For example, switches in network 100 can be members of two VLAN groups. Switches in network 100 can construct two spanning tree instances 120 and 130 corresponding to the two VLAN groups. Switches 101 and 103 are the root switches for spanning tree instances 120 and 130, respectively. A port can be in a blocking state for spanning tree instance 120 while in a forwarding state for spanning tree instance 130. During operation, if an active link of a spanning tree instance, such as the link between switches 102 and 103, fails, the corresponding forwarding ports of spanning tree instance 130 become unavailable. As a result, switch 102 can become disconnected from the other switches in spanning tree instance 130. To prevent this, the spanning tree protocol enables a disabled port, such as the port coupling switch 102 to switch 101, to provide an alternative link, and provide connectivity to switch 102 in spanning tree instance 130.

Figure 2:
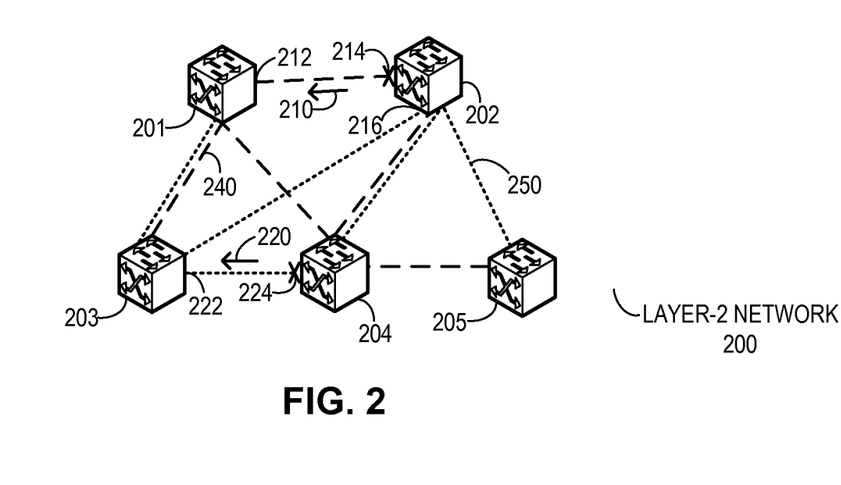
FIG. 2 illustrates exemplary multiple spanning tree instances in a layer-2 network with blocked-port notification, in accordance with an embodiment of the present invention.

FIG. 2 illustrates exemplary multiple spanning tree instances in a layer-2 network with blocked-port notification, in accordance with an embodiment of the present invention. A layer-2 network 200 includes switches 201, 202, 203, 204, and 205. In some embodiments, one or more switches in network 200 can be a fabric switch and can appear as a single logical switch to all other switches in network 200. During operation, a respective switch in network 200 runs spanning tree protocol and constructs spanning tree instances 240 and 250 for a respective VLAN group. A port can be in a blocking state for a specific spanning tree instance while in a forwarding state for another spanning tree instance. For example, port 216 is in a forwarding state for spanning tree instance 250 while in a blocking state for spanning tree instance 240. Ports 212 and 214, and ports 222 and 224 are peer ports, respectively.

In this example, switches 201 and 203 are the root switches for spanning tree instances 240 and 250, respectively. All ports in switches 201 and 203 are designated ports for spanning tree instances 240 and 250, respectively. During operation, when switch 201 receives any unknown, multicast, or broadcast traffic, switch 201 floods the traffic via all ports. However, the peer port of a designated port can be in a blocking state. For example, port 214 in switch 202, which is a peer port of designated port 212 of switch 201, is in a blocking state (denoted with a cross sign). The forwarded traffic from switch 201 via port 212 is dropped at port 214. Similarly, port 224 in switch 204, which is a peer port of designated port 222 of switch 203, is in a blocking state. The forwarded traffic from switch 203 via port 222 is dropped at port 224. Hence, flooding traffic via all ports of switches 201 and 203, when the corresponding peer ports are in blocking states, wastes network bandwidth, causes congestion and traffic drops, and increases the carbon footprint in network 200.

To solve this problem, switch 202 dynamically constructs a notification message 210 just before putting port 214 into a blocking state and sends message 210 via port 214 to corresponding peer port 212 in switch 201.

After sending the message, switch 202 puts port 214 into the blocking state. By receiving message 210 via port 212, switch 201 recognizes that peer port 214 is in a blocking state. Note that switch 202 includes the spanning tree instance information corresponding to the VLAN group in notification message 210. In some embodiments, notification message 210 is an xSTP configuration Bridge Protocol Data Unit (BPDU) with flags set to "11111111." Switch 202 can transmit this configuration BPDU after the convergence of xSTP. Similarly, switch 204 also dynamically constructs a notification message 220 regarding the blocking state of port 224 just before putting port 224 into the blocking state and sends message 220 to corresponding peer port 222 in switch 203.

Switches 201 and 203 thus become aware of the blocking states of peer ports 214 and 224, respectively. In some embodiments, switches 201 and 203 make entries in their respective forwarding tables corresponding to the blocked peer ports. As a result, switches 201 and 203 suppress the flooding of unknown, multicast, or broadcast traffic via ports 212 and 222, respectively. In this way, switches 201 and 203 save bandwidth and networking resources, and reduce the carbon footprint in network 200. In some embodiments, only the root switch of a spanning tree instance suppresses flooding to a blocked peer port because all ports of the root port are typically designated ports.

Flooding Suppression

Figure 3A:
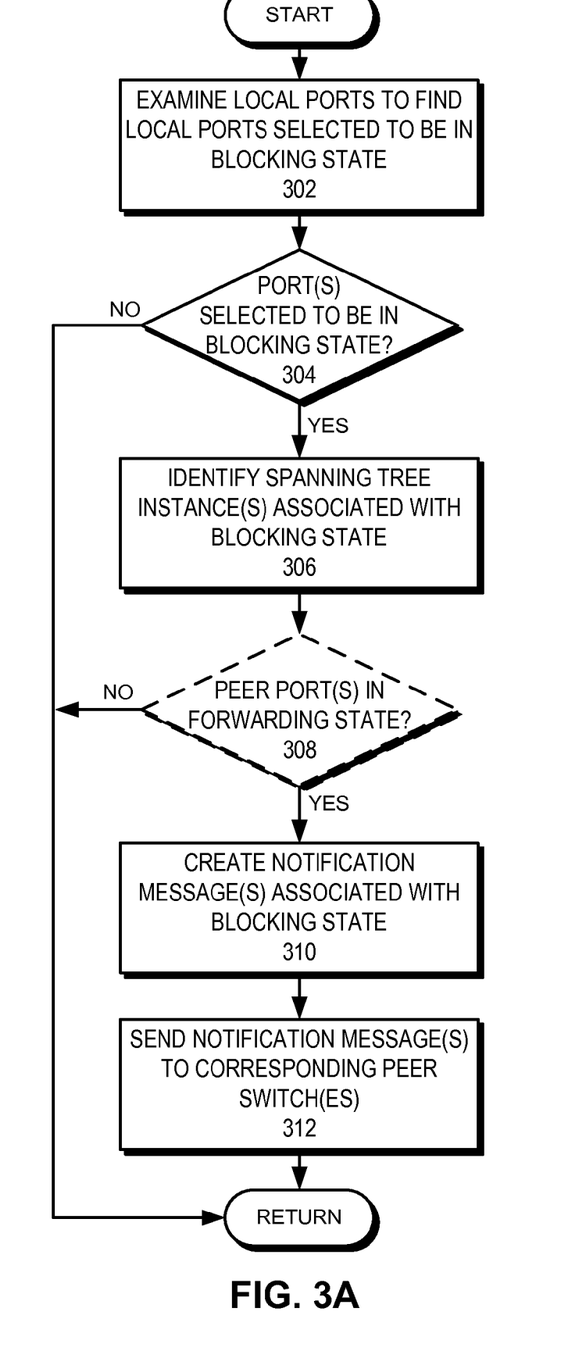
FIG. 3A presents a flowchart illustrating the process of a switch notifying a peer switch regarding a blocked port, in accordance with an embodiment of the present invention.

For the example in FIG. 2, switch 202 sends notification message 210 to switch 201 regarding blocked port 214. Upon receiving notification message 210, switch 201 suppresses flooding via port 212. Hence, the flooding suppression process comprises notifying a peer switch about a local blocked port and suppressing, by the peer switch, the flooding of frames to the blocked port. FIG. 3A presents a flowchart illustrating the process of a switch notifying a peer switch regarding a local blocked port, in accordance with an embodiment of the present invention. The switch first examines the local ports to find local ports selected to be in a blocking state (operation 302). In some embodiments, the switch examines the local ports after the convergence of xSTP. The switch then checks whether any examined port is selected to be in a blocking state (operation 304).

If one or more local port(s) are selected to be in a blocking state, the switch identifies the spanning tree instance(s) associated with the blocking state (operation 306). The switch can be participating in multiple spanning tree instances, as described in conjunction with FIG. 2. The switch can optionally check whether the peer port(s) of the selected ports are in a forwarding state (operation 308) in the corresponding spanning tree instance(s). If the switch has not already received notifications regarding a blocking state of the peer port(s), the switch considers the peer port(s) to be in a forwarding state. The switch then creates notification message(s) dynamically constructs a notification message associated with the blocking state (operation 310) and sends the notification message(s) to the corresponding peer switch(es) (operation 312) via the selected port(s). A notification message can be an xSTP configuration BPDU with the flags set to "11111111." In some embodiments, the switch creates and sends the notification messages without checking whether the peer port(s) are in a forwarding state. The switch does not take any action if no local port is in a blocking state (operation 304) or the peer port is not in a forwarding state (operation 308).

Figure 3B:
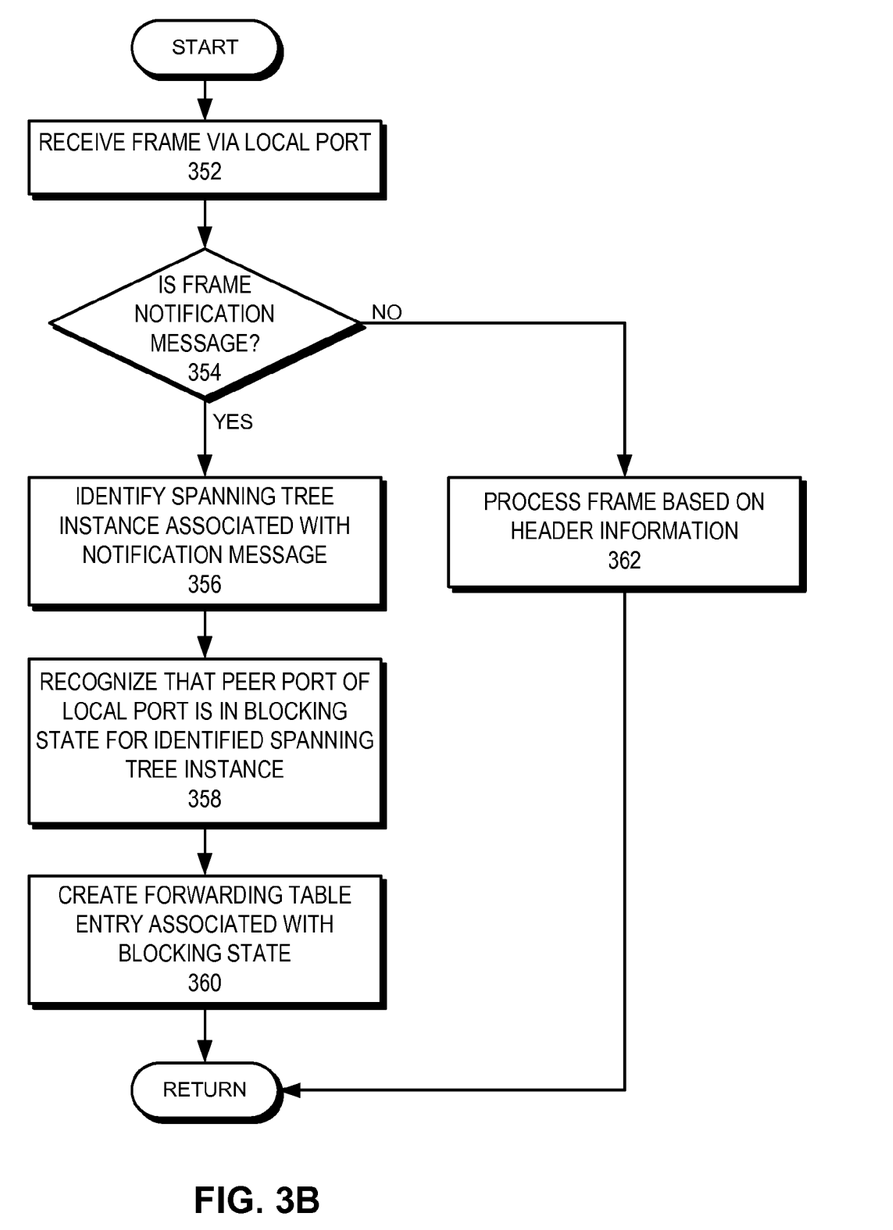
FIG. 3B presents a flowchart illustrating the process of a switch identifying a blocked peer port, in accordance with an embodiment of the present invention.

FIG. 3B presents a flowchart illustrating the process of a switch identifying a blocked peer port, in accordance with an embodiment of the present invention. Upon receiving a frame via a local port (operation 352), the switch checks whether the received frame is a notification message (operation 354). The notification message can be an xSTP configuration BPDU with the flags set to "11111111." If the frame is not a notification message, the switch processes the frame based on the header information (operation 362). In some embodiments, the switch can be a member of multiple spanning tree instances. If the frame is a notification message, switch identifies a spanning tree instance associated with the notification message (operation 356). The switch can extract an identifier of the spanning tree instance from the notification message to identify the spanning tree instance.

By receiving the notification message via the local port, the switch then recognizes that the peer port of the local port is in a blocking state for the identified spanning tree instance (operation 358). The switch creates a forwarding table entry associated with the blocking state of the peer port (operation 360). In some embodiments, the entry contains at least an identifier of the local port and the identifier of the spanning tree instance. Whenever the switch receives an unknown, multicast, or broadcast frame, the switch checks the entry and prevents flooding via the local port for the corresponding spanning tree instance.

Figure 4:
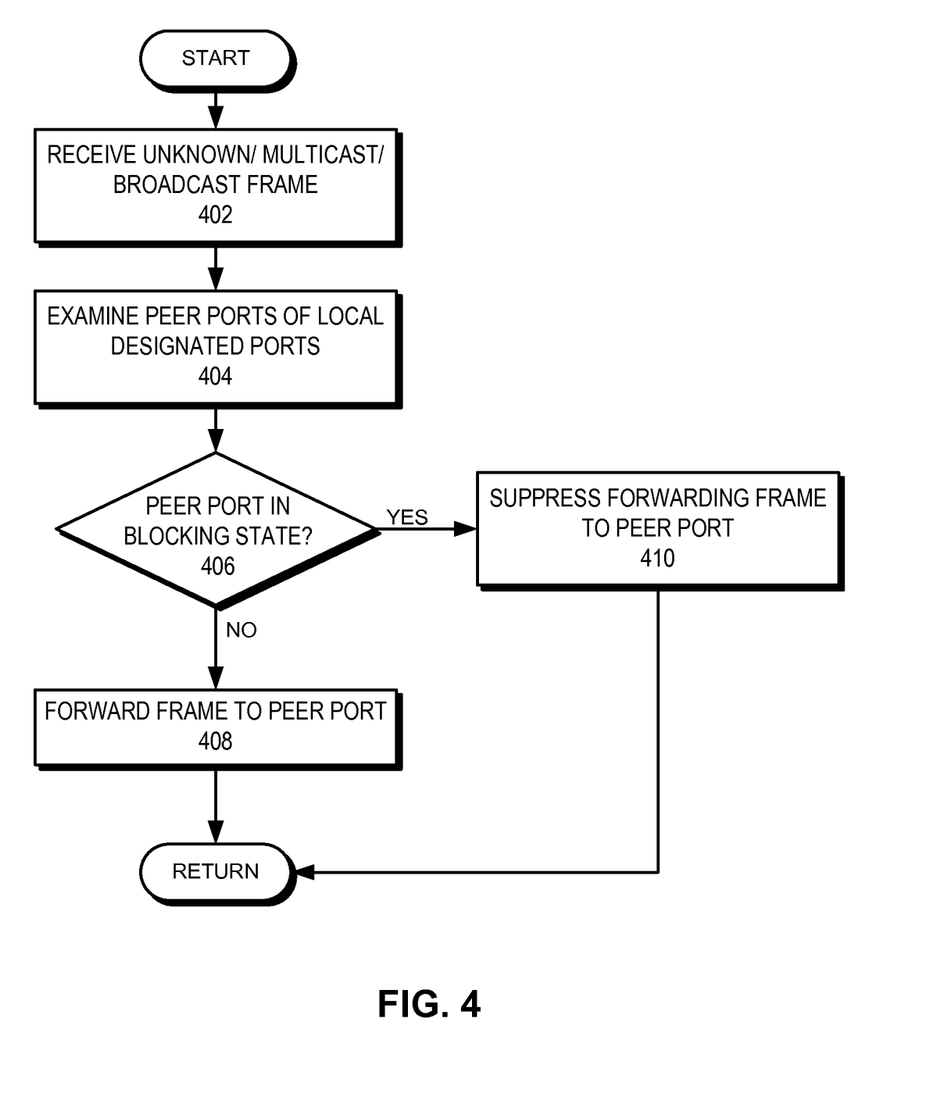
FIG. 4 presents a flowchart illustrating the process of a switch suppressing frame forwarding to a peer port in a blocking state, in accordance with an embodiment of the present invention.

FIG. 4 presents a flowchart illustrating the process of a switch suppressing frame forwarding to a peer port in a blocking state, in accordance with an embodiment of the present invention. In some embodiments, the switch is the root switch of a spanning tree instance. Upon receiving an unknown, multicast, or broadcast frame (operation 402), the switch examines peer ports of local designated ports (operation 404). If the switch is a root switch, a respective port of the switch can be a designated port. The switch then checks whether the peer port is in a blocking state (operation 406). In some embodiments, the switch checks a local forwarding table to check whether the peer port is in a blocking state. If the peer port is in a blocking state, the switch suppresses forwarding the frame (i.e., flooding) to the peer port (operation 410). Otherwise, the switch forwards the frame to the peer port (operation 408).

Network Chances

Figure 5:
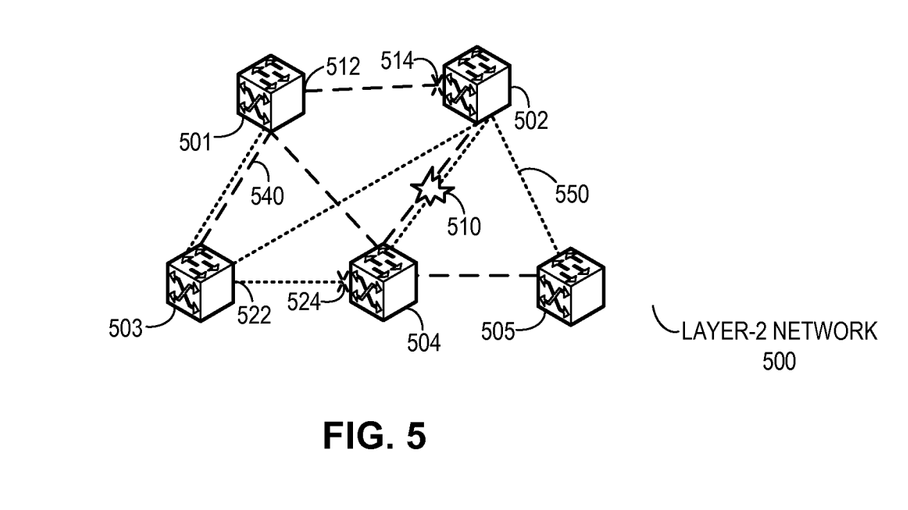
FIG. 5 illustrates an exemplary failure in a layer-2 network with multiple spanning tree instances, in accordance with an embodiment of the present invention.

When a new switch joins or leaves a layer-2 network, the network topology changes. For example, a switch leaves a network when the switch fails. FIG. 5 illustrates an exemplary failure in a layer-2 network with multiple spanning tree instances, in accordance with an embodiment of the present invention. A layer-2 network 500 includes switches 501, 502, 503, 504, and 505. In some embodiments, one or more switches in network 500 can be a fabric switch and can appear as a single logical switch to all other switches in network 500. During operation, a respective switch in network 500 runs spanning tree protocol and constructs spanning tree instances 540 and 550 for a respective VLAN group. In this example, switches 501 and 503 are the root switches for spanning tree instances 540 and 550, respectively. Switches 502 and 504 detects that local ports 514 and 524, respectively, are selected to be in a blocking state and dynamically construct notification messages associated with the blocking states of ports 514 and 524, respectively. Switches 502 and 504 then send the notification messages to corresponding peer ports 512 and 522 in switches 501 and 503, respectively. After sending the messages, switches 502 and 504 put ports 514 and 524, respectively, into a blocking state. As a result, when switches 501 and 503 receive any unknown, multicast, or broadcast frame, switches 501 and 503 suppress forwarding the frame via ports 512 and 522, respectively.

Suppose that failure 510 occurs on the link between switches 502 and 504. As a result, switches in network 500 reconstruct spanning tree instances 540 and 550 in network 500. Consequently, blocked ports 514 and 524 become forwarding ports, and switches 502 and 504 do not send any notification message to switches 501 and 503, respectively. Because corresponding peer switches 501 and 503 do not receive the notification messages, after reconstructing spanning tree instances 540 and 550, switches 501 and 503 do not suppress flooding via ports 512 and 522, respectively. When switches 501 and 503 receive any unknown, multicast, or broadcast frame, switches 501 and 503 forward the frame via ports 512 and 522.

Figure 6:
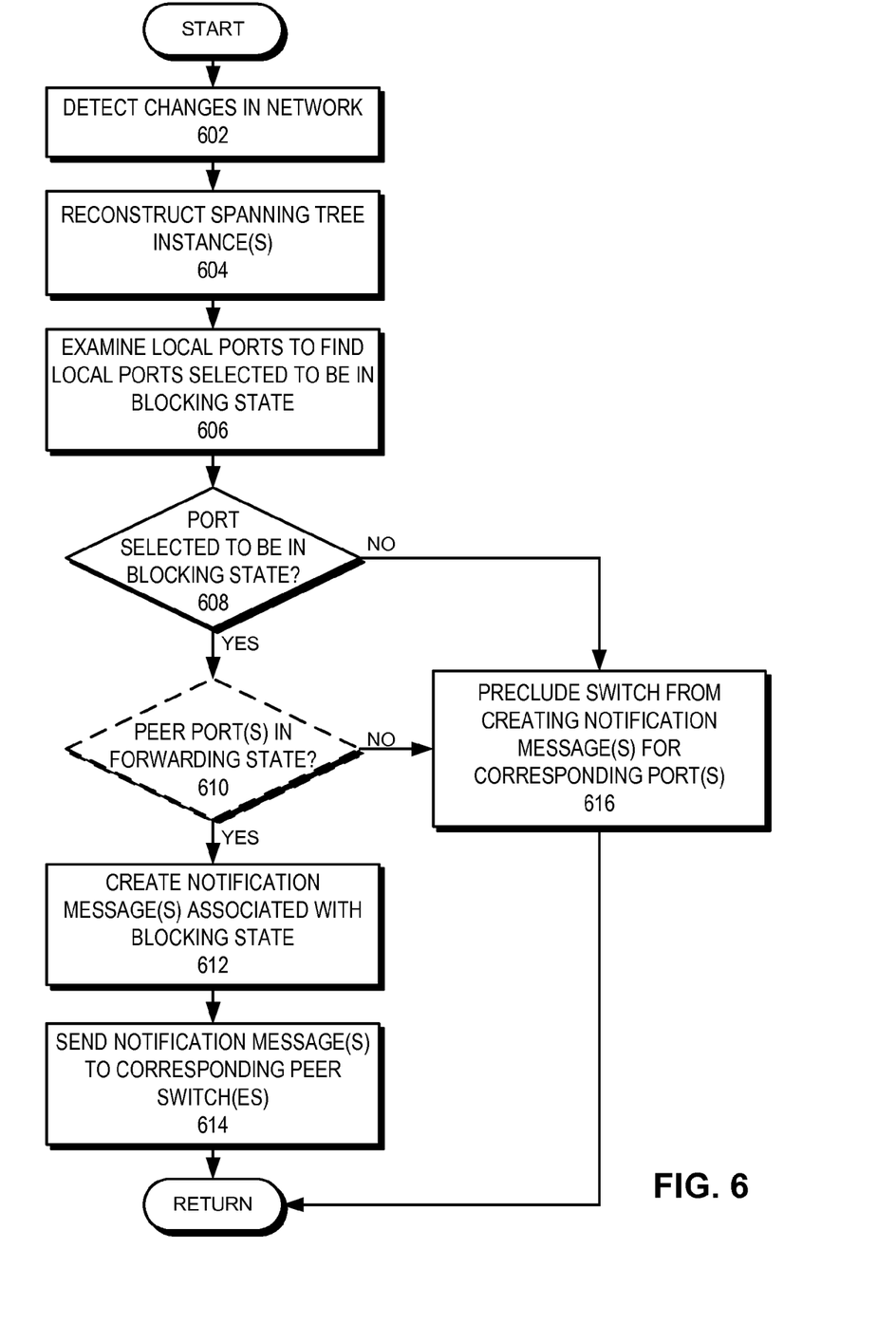
FIG. 6 presents a flowchart illustrating the process of a switch responding to a change in a network, in accordance with an embodiment of the present invention.

FIG. 6 presents a flowchart illustrating the process of a switch responding to a change in a network, in accordance with an embodiment of the present invention. Upon detecting any changes to the network (operation 602), the switch reconstructs spanning tree instance(s) in the network (operation 604). A change in the network can include, but is not limited to, a link or a node failure, addition or deletion of a physical or virtual switch, and migration of a physical or virtual switch. In some embodiments, the switch implements MSTP and has multiple spanning tree instances corresponding to multiple VLAN groups, wherein the switch reconstructs a spanning tree instance for a respective VLAN group. The switch then examines the local ports to find local ports selected to be in a blocking state (operation 606). The switch then checks whether any examined port are selected to be in a blocking state (operation 608).

If one or more identified port(s) are selected to be in a blocking state, then the switch can optionally check whether the peer port(s) of the selected ports are in a forwarding state (operation 610). If the switch has not already received notifications regarding a blocking state of the peer port(s), the switch considers the peer port(s) to be in a forwarding state. The switch then creates notification message(s) dynamically constructs a notification message associated with the blocking state (operation 612) and sends the notification message(s) to the corresponding peer switch(es) (operation 614) via the selected port(s). A notification message can be an xSTP configuration BPDU with the flags set to "11111111."

In some embodiments, the switch creates and sends the notification messages without checking whether the peer port(s) are in a forwarding state. If one or more ports are not selected to be in a blocking state (operation 608) or if the peer port(s) are not in a forwarding state (operation 610), the switch is precluded from creating notification message(s) for the corresponding ports (operation 616).

Exemplary Switch

Figure 7:
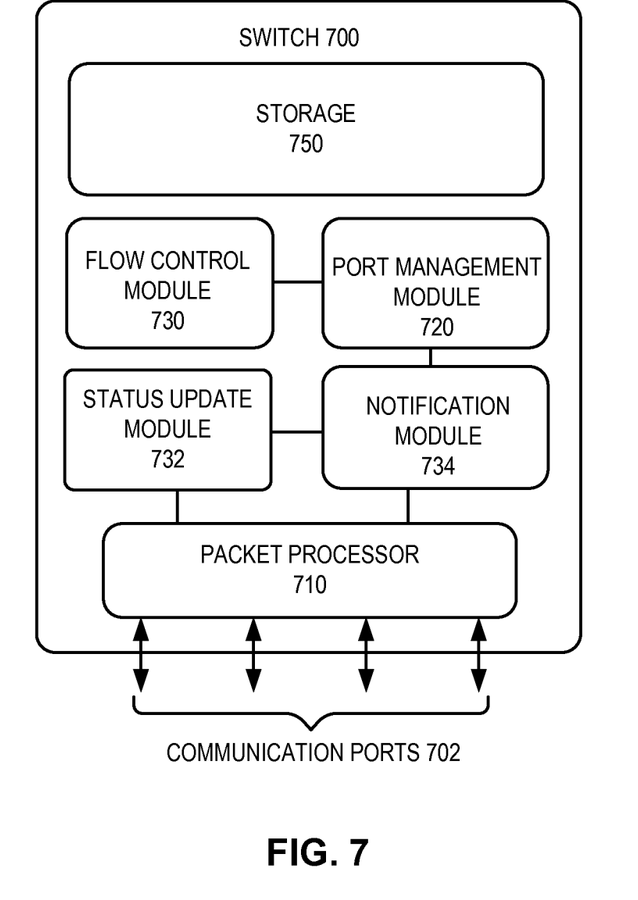
FIG. 7 illustrates an exemplary switch, in accordance with an embodiment of the present invention.

FIG. 7 illustrates an exemplary switch, in accordance with an embodiment of the present invention. In this example, a switch 700 includes communication ports 702, a packet processor 710, a port management module 720, a flow control module 730, a status update module 732, a notification module 734, and a storage 750. In some embodiments, switch 700 may maintain a membership in a fabric switch. Packet processor 710 processes frames received via communication ports 702.

During operation, port management module 720 identifies a local port (i.e., one of the communication ports 702) selected to be in a blocking state associated with a spanning tree instance. Upon identifying the port, notification module 734 constructs a notification message (e.g., a configuration BPDU) associated with the blocking state. This notification message can have a destination address of a remote switch coupled to switch 700 via the local port. By receiving this notification message via a local port, a peer switch of switch 700 recognizes that the port in switch 700 is in a blocking state. If switch 700 belongs to multiple VLAN groups, the spanning tree instance can be associated with one of the VLAN groups. Under such a scenario, the notification message is specific for the VLAN group.

If the network to which switch 700 belongs changes, switch 700 reconstructs the spanning tree instance. In the reconstructed spanning tree instance, if the local port is put into a forwarding state, status update module 732 identifies the change, as described in conjunction with FIG. 6. Status update module 732 then precludes notification module 734 from generating the notification message.

On the other hand, if switch 700 receives such a notification message via one of the communication ports 702, packet processor 710 examines the received message and extracts a blocking state of a port in a remote switch from the notification message. Port management module 720 identifies the spanning tree instance associated with the notification message. Flow control module 730 identifies a local peer port of the blocked port in the remote switch based on the received notification message and stores information regarding the blocking state in a local forwarding table residing in storage 750. Flow control module 730 then suppresses flooding of unknown, multicast, and broadcast traffic via the local peer port. If switch 700 belongs to multiple VLAN groups, flow control module 720 suppresses flooding for the VLAN group associated with the identified spanning tree instance.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for intelligent layer-2 forwarding in a spanning tree. In one embodiment, the switch includes a port management module and a notification module. During operation, the port management module identifies a local port in a blocking state associated with a spanning tree. The notification module constructs a notification message associated with the blocking state. Another embodiment of the present invention provides a switch. The switch includes a packet processor and a flow control module. The packet processor extracts from a notification message a blocking state of a port in a remote switch. The blocking state is associated with a spanning tree. The flow control module suppresses flooding via a local peer port of the port in the remote switch in response to extracting the blocking state.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
 a port management module adapted to identify a local port of the switch, wherein the local port is selected to be in a blocking state associated with a spanning tree; and
 a notification module adapted to construct a notification message with a destination address corresponding to a remote switch, wherein the notification message indicates the blocking state of the local port, and wherein the remote switch is a root of the spanning tree.

2. The switch of claim 1, wherein the remote switch is coupled to the switch via the local port.

3. The switch of claim 1, wherein the notification message is a Bridge Protocol Data Unit (BPDU) associated with a protocol constructing the spanning tree; and
 wherein a flag is set in the BPDU to indicate the blocking state.

4. The switch of claim 1, wherein the spanning tree is associated with a virtual local area network (VLAN) group, wherein the VLAN group comprises at least one VLAN associated with the switch; and
 wherein the notification message is specific to the VLAN group.

5. The switch of claim 1, further comprising a status update module adapted to preclude the notification module from generating the notification message in response to the local port being in a forwarding state associated with the spanning tree.

6. The switch of claim 1, wherein the switch and the remote switch are member switches of a fabric switch, wherein the fabric switch includes a plurality of member switches operating as a single switch.

7. A switch, comprising:
  a packet processor adapted to extract from a notification message a blocking state of a first port of a remote switch, wherein the blocking state is associated with a spanning tree, wherein a destination address of the notification message corresponds to the switch, and wherein the switch is a root of the spanning tree; and
  a flow control module adapted to suppress flooding via a second port of the switch in response to extracting the blocking state, wherein the second port is a peer port of the first port.

8. The switch of claim 7, wherein the notification message is a Bridge Protocol Data Unit (BPDU) associated with a protocol constructing the spanning tree; and
  wherein a flag is set in the BPDU to indicate the blocking state.

9. The switch of claim 7, wherein the spanning tree is associated with a virtual local area network (VLAN) group, wherein the VLAN group comprises at least one VLAN associated with the switch; and
  wherein the flow control module is further configurable to suppress flooding for the VLAN group.

10. The switch of claim 7, wherein the flow control module is further adapted to store information regarding the blocking state of the first port in a local forwarding table of the switch.

11. A method, comprising:
  identifying, by a switch, a local port of the switch, wherein the local port is selected to be in a blocking state associated with a spanning tree; and
  constructing a notification message with a destination address corresponding to a remote switch, wherein the notification message indicates the blocking state of the local port, and wherein the remote switch is a root of the spanning tree.

12. The method of claim 11, wherein the remote switch is coupled to the switch via the local port.

13. The method of claim 11, wherein the notification message is a Bridge Protocol Data Unit (BPDU) associated with a protocol constructing the spanning tree; and
  wherein a flag is set in the BPDU to indicate the blocking state.

14. The method of claim 11, wherein the spanning tree is associated with a virtual local area network (VLAN) group, wherein the VLAN group comprises at least one VLAN associated with the switch; and
  wherein the notification message is specific to the VLAN group.

15. The method of claim 11, further comprising precluding from generating the notification message in response to the local port being in a forwarding state associated with the spanning tree.

16. The method of claim 11, wherein the switch and the remote switch are member switches of a fabric switch, wherein the fabric switch includes a plurality of member switches operating as a single switch.

17. A method, comprising:
  extracting, by a switch, from a notification message a blocking state of a first port of a remote switch, wherein the blocking state is associated with a spanning tree, wherein a destination address of the notification message corresponds to the switch, and wherein the switch is a root of the spanning tree; and
  suppressing flooding via a second port of the switch in response to extracting the blocking state, wherein the second port is a peer port of the first port.

18. The method of claim 17, wherein the notification message is a Bridge Protocol Data Unit (BPDU) associated with a protocol constructing the spanning tree; and
  wherein a flag is set in the BPDU to indicate the blocking state.

19. The method of claim 17, wherein the spanning tree is associated with a virtual local area network (VLAN) group, wherein the VLAN group comprises at least one VLAN associated with the switch; and
  wherein the flow control module is further configurable to suppress flooding for the VLAN group.

20. The method of claim 17, further comprising storing information regarding the blocking state of the first port in a local forwarding table of the switch.

* * * * *